April 2, 1929.  W. SARFERT  1,707,773
ELECTRICAL QUANTITIES MEASURING SYSTEM
Filed May 10, 1924

Patented Apr. 2, 1929.

1,707,773

UNITED STATES PATENT OFFICE.

WILLY SARFERT, OF DRESDEN, GERMANY, ASSIGNOR TO SACHSENWERK, LICHT-UND KRAFT-AKTIENGESELLSCHAFT, OF NIEDERSEDLITZ, GERMANY.

ELECTRICAL-QUANTITIES MEASURING SYSTEM.

Application filed May 10, 1924, Serial No. 712,499, and in Germany November 30, 1923.

In plants for high voltage the voltage transformers are in many ways the most troublesome apparatus. Although said transformers are usually designed for measuring purposes only, in the case of very high voltage, they are of very large dimensions, are costly, and occupy much valuable space in the switch plant. However their worst feature is unreliability in service. It is practically impossible to maintain, without exceeding permissible costs, the same continuity of service of said transformers, as of that of the other parts of the plant. This difficulty is particularly serious because there are no reliable safety-devices for automatically opening the measuring transformer circuits. Fuses are insufficient on very high voltages, and oil-break switches with automatic releases are out of question because of their costs. Efforts have been made to eliminate the voltage transformers by the use of electrostatic measuring apparatus. This substitution, however, was not satisfactory because electrostatic instruments for measuring voltage are not sufficiently accurate and electric meters cannot be employed with them.

I have found that in apparatus to which reference has been made the difficulties may be overcome and the desired objects obtained by the use of a main transformer together with a correction transformer and a voltage transformer by connecting the measuring instruments in multiple in a circuit in which the secondary coils of the correction transformer and the voltage transformer are placed in series. In so doing a load is connected in multiple across the terminals of the secondary coil of the correction transformer. This load is so designed that the impedance thereof is such that the ratio of the voltage drop across the load to the voltage drop across the secondary coil of the voltage transformer is substantially equal to the ratio between the voltage drop across the primary and secondary coils of the main transformer, the relationship being such that the voltage drop of the load added to the voltage drop of the secondary coil of the voltage transformer is the total voltage of the metering circuit and this total voltage varies in a constant relationship to the primary voltage of the main transformer.

Figure 1:
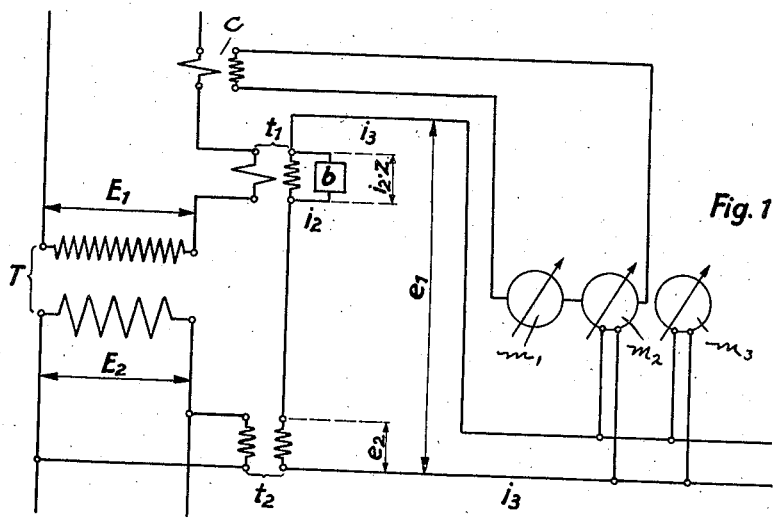

In the accompanying drawings: Fig. 1 is a diagram of connections of one example according to the invention.

Figure 2:
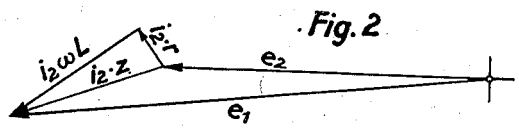

Fig. 2 is an explanatory vector diagram of voltages, and

Figure 3:
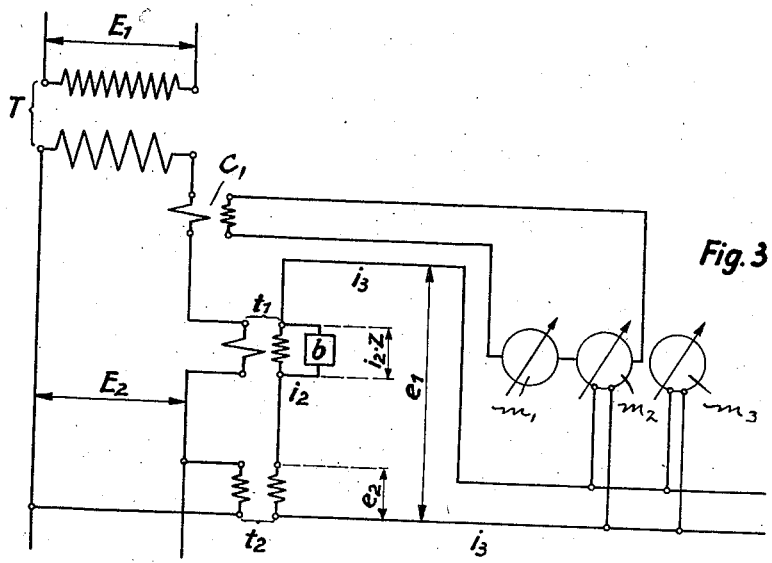

Fig. 3 a diagram of connections of another example according to the invention.

Referring to Fig. 1 of the drawings, in this constructional example of an apparatus embodying the invention the high voltage $E_1$ is transformed by the transformer T to the lower voltage $E_2$. The primary winding of a voltage transformer $t_2$ is connected across the low voltage side of the transformer T, and the primary winding of the correction transformer $t_1$ is connected in series with the coil of the high voltage side. The secondary coils of both said transformers $t_1$ and $t_2$ are connected in series in a circuit in which the voltage coils of a voltmeter $m_3$ and a wattmeter $m_2$ are connected, whereas the current coils of the wattmeter $m_2$ and an ammeter $m_1$ are connected in series in the secondary circuit of a transformer $c$ in the high voltage side of the apparatus, A suitable load indicated at $b$ is connected in multiple across the terminals of the secondary coil of the correction transformer $t_1$.

In order that in the following description of the nature of the voltage correction to be made may be clearly understood, let $e_k=$ short-circuit voltage in per cent of the main transformer T, $\sqrt{W^2+(L\omega)^2}=z=$impedance of the load $b$, $W=$ohmic resistance of the load $b$, $L=$inductive resistance of the load $b$, $i_2=$load current of the correction transformer $t_1$, $e_r=$ohmic voltage drop of the main transformer T in per cent, $e_s=$inductive voltage drop of the main transformer T in per cent.

The secondary voltage $e_2$ of the voltage transformer is combined with the additional voltage $i_2.z$ of the correction transformer to form the total voltage $e_1$ as shown by the voltage-diagram in Fig. 2. The voltage diagram of the measuring circuit (Fig. 2) constructed for a ratio of transformation of the transformer $t_2$ and the main transformer T equal one to one, must correspond with the voltage diagram of the main transformer T so as to ensure, regardless of the scale employed, a precise correspondence between the measuring voltage $e_1$ and the high voltage $E_1$ to be measured. This will be the case if the measuring current $i_3$ is sufficiently low in proportion to the load current $i_2$ of the correction transformer and the impedance of the load $b$ is selected according to the equation:

$$\sqrt{W^2 + (L\omega)^2} = \frac{e_2}{i_2} \cdot 10^{-2} e_k.$$

In other words the load must be selected in such a manner that the additional voltage $i_2 \cdot z$ precisely corresponds to the total voltage drop of the transformer T. For this purpose the ratio of the voltage $i_2 \cdot z$ to the voltage $e_2$ must be of the same value as the ratio of the total voltage drop of the transformer T to the low voltage $E_2$. Further, the voltage drop $i_2 \cdot z$ (Fig. 2) must be distributed between the components caused by an ohmic voltage drop ($i_2 \cdot r$ and by the inductive voltage drop ($i_2 \cdot \omega L$) in the same manner as is the case for the main transformer. This will be the case if:

$$W = \frac{e_2}{i_2} \cdot 10^{-2} \cdot e_r \text{ and } L \cdot \omega = \frac{e_2}{i_2} 10^{-2} \cdot e_s.$$

All these conditions can be fulfilled precisely, the error caused by the measuring current $i_3$ can be kept extraordinarily low, if the correction transformer $t_1$ and its load current $i_2$ are of sufficiently high value.

In the diagram of connections represented by Fig. 3, the arrangement is the same as in Fig. 1, only the correction transformer is connected to the low voltage side. The error caused thereby in the voltage measuring operation is very slight and can totally be removed by adding coils to the secondary winding of the voltage transformer $t_2$.

If the measurement of current of the high voltage side is also transferred to the low voltage side, the current coils of the instruments are supplied by the secondary winding of a current transformer $c_1$ connected to the low voltage side as shown in Fig. 3. In this case the no-load losses of the main transformer must be separately measured by a timemeter.

I claim as my invention:

1. In an apparatus of the class described a main transformer, a correction transformer, a voltage transformer, the secondary coils of the correction transformer and the voltage transformer being in series in a metering circuit, and a load connected in multiple across the terminals of the secondary coil of the correction transformer, the impedance of said load being such that the ratio of the voltage drop across the load to the voltage drop across the secondary coil of the voltage transformer is substantially the same as the ratio between the voltage drops across the primary and secondary coils of the main transformer, the said voltage drop of the load added to the voltage drop of the secondary coil of the voltage transformer forming the total voltage of the metering circuit, which total voltage varies in a constant relation to the primary voltage of the main transformer.

2. In an apparatus of the class described a main transformer, a correction transformer, a voltage transformer, the primary coil of the correction transformer being in series with the primary coil of the main transformer, the primary coil of the voltage transformer being in multiple with the secondary coil of the main transformer, the secondary coils of the correction transformer and the voltage transformer being in series in a metering circuit, and a load in multiple across the terminals of the secondary coil of the correction transformer, the impedance of said load being such that the ratio of the voltage drop across the load to the voltage drop across the secondary coil of the voltage transformer is substantially the same as the ratio between the voltage drops across the primary and secondary coils of the main transformer, the said voltage drop of the load added to the voltage drop of the secondary coil of the voltage transformer forming the total voltage of the metering circuit, which total voltage varies in a constant relation to the primary voltage of the main transformer.

In testimony, that I claim the foregoing as my invention, I have signed my name this 8th day of April 1924.

WILLY SARFERT.